United States Patent [19]
Bruce

[11] Patent Number: 5,809,010
[45] Date of Patent: Sep. 15, 1998

[54] TRIBUTARY PROTECTION SYSTEM

[75] Inventor: Paul Alan Bruce, Chelmsford, United Kingdom

[73] Assignee: Northern Telecom Limited, Montreal, Canada

[21] Appl. No.: 528,635

[22] Filed: Sep. 14, 1995

[30]     Foreign Application Priority Data

Oct. 26, 1994 [GB] United Kingdom .................. 9421540

[51] Int. Cl.⁶ ..................................................... H04L 1/22
[52] U.S. Cl. .......................................... 370/217; 370/225
[58] Field of Search ................................... 370/217, 219, 370/220, 221, 223, 224, 225, 227, 228; 395/181, 182.01, 182.02

[56]             References Cited

U.S. PATENT DOCUMENTS

| 4,266,293 | 5/1981 | Anderson et al. | 370/14 |
| 4,646,286 | 2/1987 | Ellson et al. | 370/16 |
| 5,014,264 | 5/1991 | Nagler et al. | 370/220 |
| 5,216,666 | 6/1993 | Stalick | 370/16.1 |
| 5,345,438 | 9/1994 | Ozaki | 370/220 |
| 5,408,462 | 4/1995 | Opoczynski | 370/220 |
| 5,493,432 | 2/1996 | Yoneda | 370/228 |
| 5,506,833 | 4/1996 | Nemoto | 370/228 |

FOREIGN PATENT DOCUMENTS

| 0184807 | 6/1986 | European Pat. Off. . |
| 59-182633 | 2/1985 | Japan . |
| 2053621 | 2/1991 | United Kingdom . |

OTHER PUBLICATIONS

British Telecommunication Engineering Jul. 1986 vol. 5, Pt 2, pp. 113–123, Myall J.V.W. The Design of Production Terminal Equipment for Digital Optical–Fibre Submarine Cable Systems.

Primary Examiner—Douglas W. Olms
Assistant Examiner—Min Jung
Attorney, Agent, or Firm—Lee, Mann, Smith, McWilliams, Sweeney & Ohlson

[57]            ABSTRACT

The present invention provides a novel tributary protection system for a telecommunications system employing multiplexed lines. To overcome problems with separate line controllers which select the multiplexers to be used, the invention teaches a system wherein each tributary channel interfaces with the multiplexers Mux 1, Mux 2 via a protection device MPD which can switch the tributaries between a first multiplex Mux 1 and a second multiplex Mux 2 when the performance of the system employing the operational multiplexer Mux 1 has been degraded.

10 Claims, 4 Drawing Sheets

TRIBUTARY PROTECTION SYSTEM

FIELD OF THE INVENTION

This invention relates to a telecommunication system employing multiplexed line systems. In particular the invention relates to a telecommunication system employing redundancy.

BACKGROUND OF THE INVENTION

As is known, many telecommunication systems comprise a number of multiplexed channels, wherein each multiplexer can be served by a number of sub-systems which can comprise a number of tributary channels. Each tributary receives data from and transmits data to a respective multiplexer. In case of the performance of one of the channels being degraded or even failure of such, for example because of road works, then a further, standby, system may be provided. This type of standby system is common in all but shorthaul links. Such systems are also required to comply with industry standards.

A simple form of standby is the broadcast method wherein the signal is broadcast along all communication channels and the choice as to which signal to be used is made at the receiver. This can very quickly lead to under capacity since all data is at least duplicated. A more advanced standby form is the use of separate controllers associated with each group of multiplexers; switches operable to switch particular multiplexers are controlled by these controllers which communicate with each other on a separate line—which can be costly. These controllers also communicate with the multiplexers to determine which multiplex line should be used. Furthermore these controllers can operate with equal weight or in a master/slave relationship. These controllers require separate plug-in components which result in extra expense and the need to provide shelving for such plug-in components. These systems described above require individual switches per tributary and can therefore become very complicated since a communication link is required per tributary and the respective controller. Such systems are accordingly difficult to implement. FIG. 4 shows an example of such an implementation.

The present invention seeks to provide an improved tributary protection system.

SUMMARY OF THE INVENTION

In accordance with the invention there is provided a telecommunication system comprising first and second multiplexed lines which communicate with served systems via tributary channels, wherein each tributary channel interfaces with the multiplexed line via a protection device which causes the tributaries to be switched between a first multiplexer and a second multiplexer when the performance of the system employing the operational multiplexer has been degraded.

Preferably, for the protection devices associated with each served system, there is one master protection device which controls the other, slave, protection devices. A concatenated control bus can be used for the master protection device to control the operations of the slave protection devices. Conveniently, this concatenated control bus can be used to route signals from the multiplexer to the protection devices relating to the status of each tributary The protection devices can include erasable programmable logic devices (EPLDs) which receive data relating to the status of the tributaries and actuate switches to route the communications via the other of the multiplexers.

This system may be configured such that the multiplexed lines communicate with only one group of served systems.

BRIEF DESCRIPTION OF THE DRAWINGS

In order to aid understanding of the invention reference will now be made to the figures of the accompanying drawing sheets wherein.

DETAILED DESCRIPTION OF A PREFERRED EMBODIMENT

Figure 1:
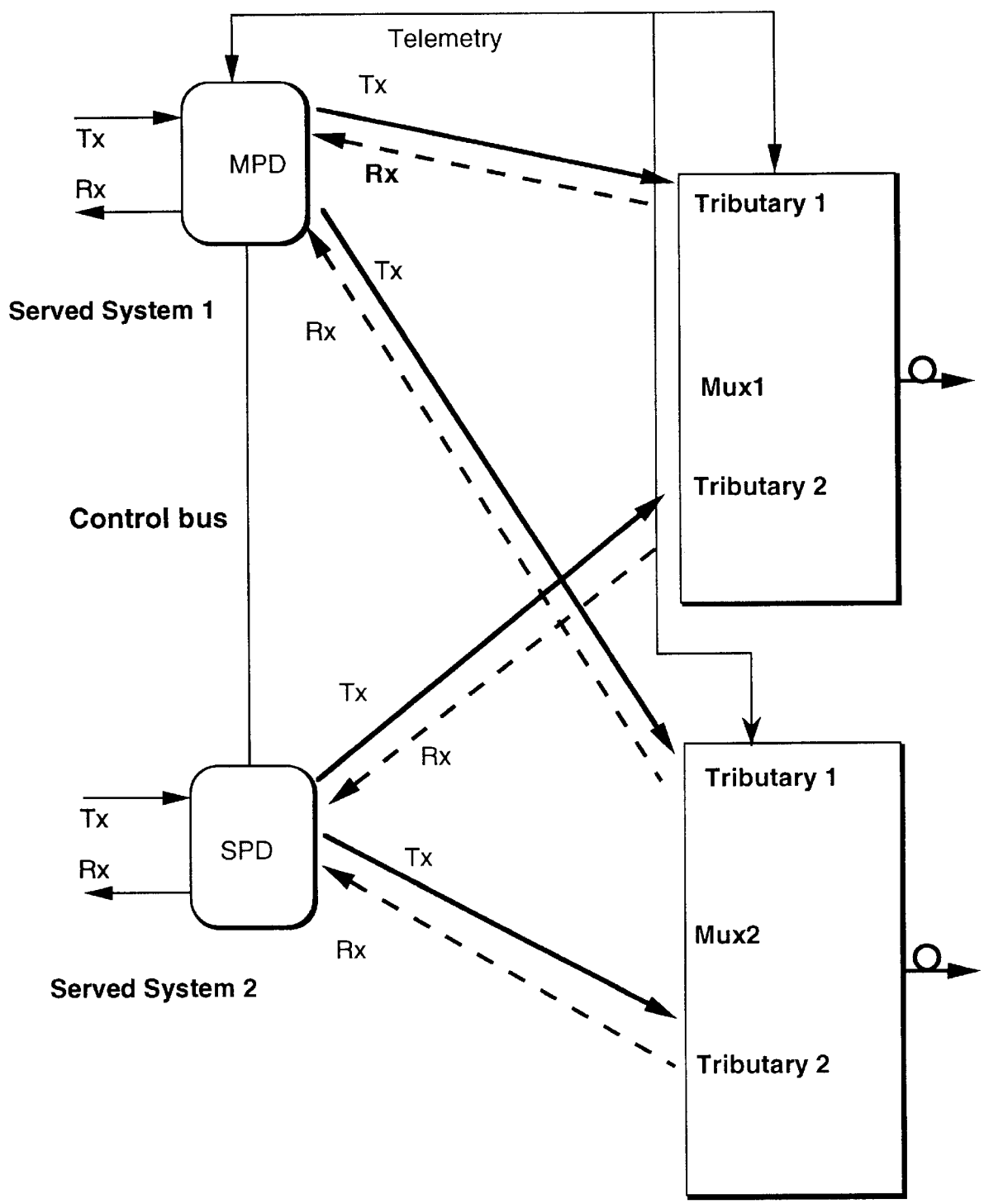
FIG. 1 shows one end of a multiplexed line system having two served systems.

Referring now to FIG. 1, there is shown one end of a multiplexed line telecommunications system 10 comprising first and second multiplexer/demultiplexer equipment Mux1 and Mux2 which communicate with served or sub-systems S1, S2 via tributary channels T1, T2. Each tributary interfaces with the multiplexers Mux1, Mux2 via protection devices, of which one comprises a master protection device and the others comprise a slave protection device. The protection devices are preferably in the form of cards which consist of a plug in unit as part of a standard modular high speed shelf. The protection device can incorporate an EPLD mounted on each card. In the event of malfunctioning of the multiplexer-line arrangement in use then the protection devices route the data being transmitted through the other of the multiplexer line arrangement via switches.

The master protection device receives data concerning the status of the tributary channels and the status of the lines via a telemetry system from the multiplexers Mux1, Mux2. The tributary protection devices receive information from the served systems, for example in the form of 140 megabits CMI coded data, although the present application is not restricted to such forms. This data is then sent to the traffic input ports of each of the two multiplexed lines. In a similar fashion, the served system or systems can receive information from each of the two multiplexed lines. Data from the traffic output ports of the two multiplexed lines is passed by the respective tributary protection device to the respective served systems.

In this particular case, the master protection device MPD communicates with the first and second multiplexer systems Mux1 and Mux2 via telemetry means and communicate with the secondary or slave protection devices SPD via a concatenated communication channel. A tributary status condition is passed from the multiplexers Mux1, Mux2 to each tributary protection switch device. These signals are then received from the slave protection devices by the master protection device via the concatenated control and status bus. A decision is made by the master protection device MPD as to which of the two multiplexed line arrangements should be used and this information is communicated to the slave protection devices SPD, also by means of the control and status bus. Thus, in the event of failure of a communication channel through a first multiplexer line arrangement then the master protection device MPD will route all communications via a second multiplexer line arrangement.

Figure 2:
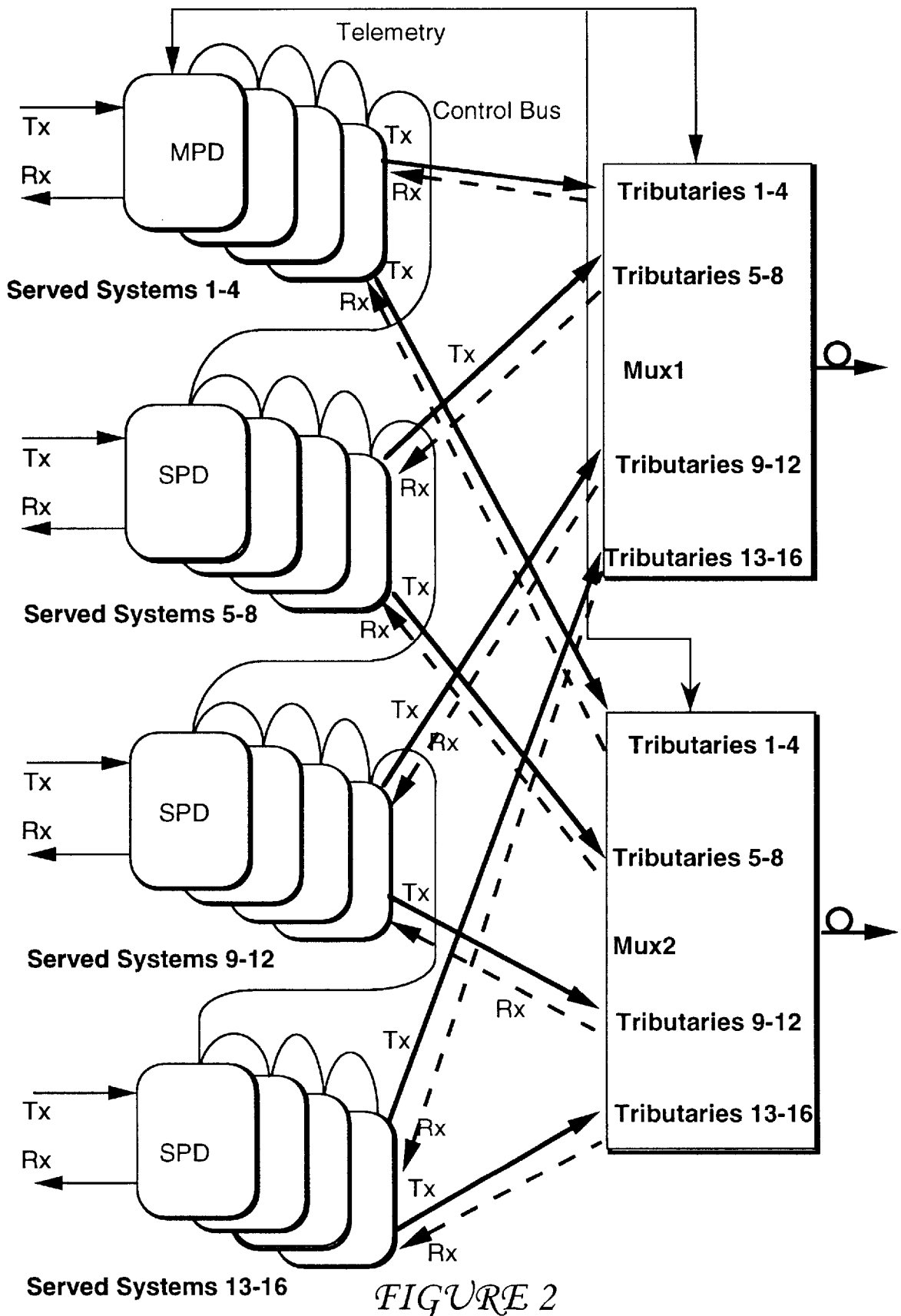
FIG. 2 shows one end of a multiplexed line system having 16 served systems.

FIG. 2 shows a second embodiment of the invention wherein the telecommunication system possesses first and second multiplexer systems Mux1 and Mux2 which communicate with the served systems S1 to S16 via tributary channels T1 to T16. Again, each tributary interfaces with Multiplexer systems Mux1, Mux2 via protection devices of which one comprises a master protection device MPD and all the further protection devices are slave protection devices SPD. Again the concatenated communication channel is used to transmit data between the master and slave protection devices. This arrangement can also be configured for larger systems. Each protection device comprises a tributary protection switch as discussed in relation to the first embodiment.

Figure 3:
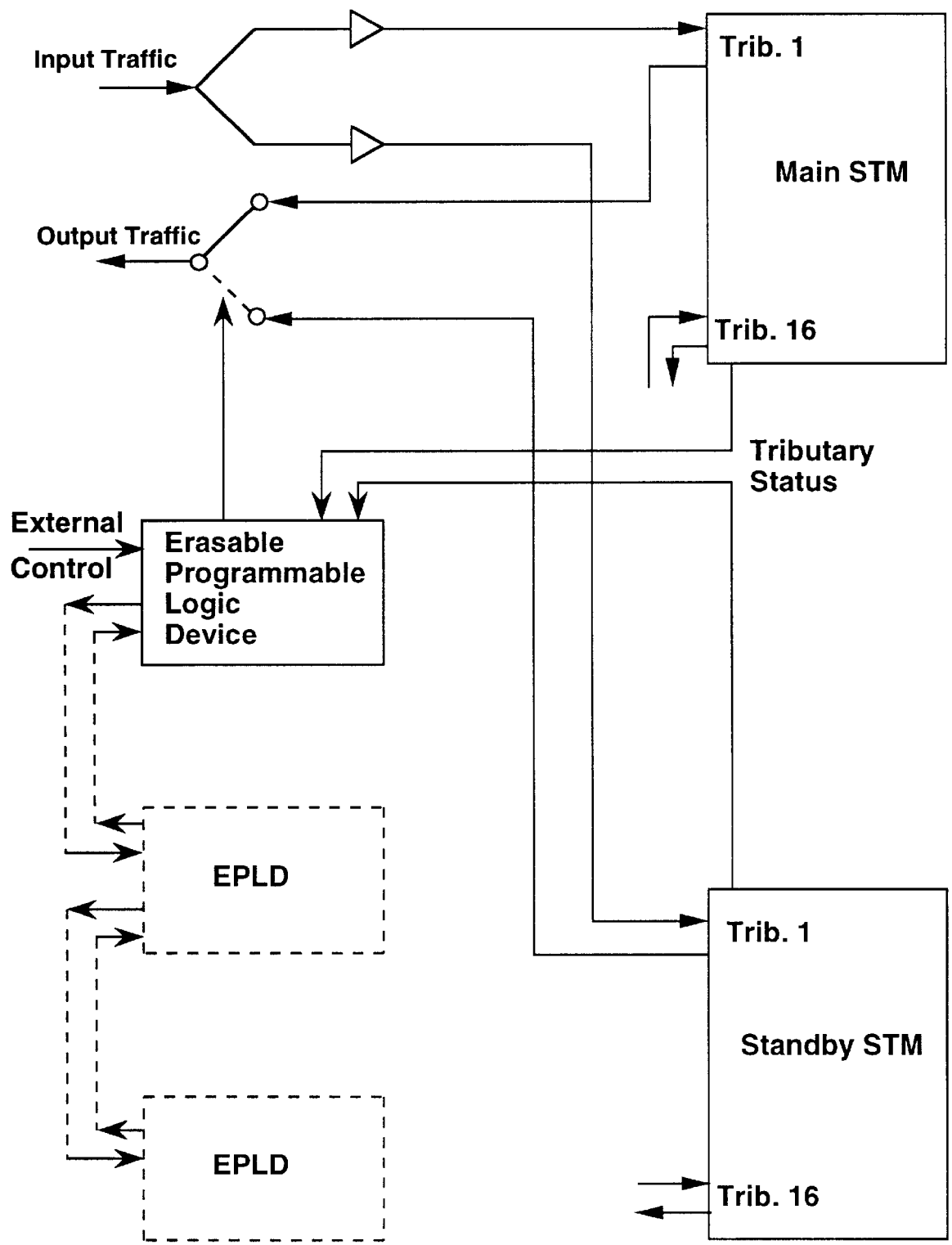
FIG. 3 shows in detail the operation of a tributary protection device for one tributary.
Figure 4:
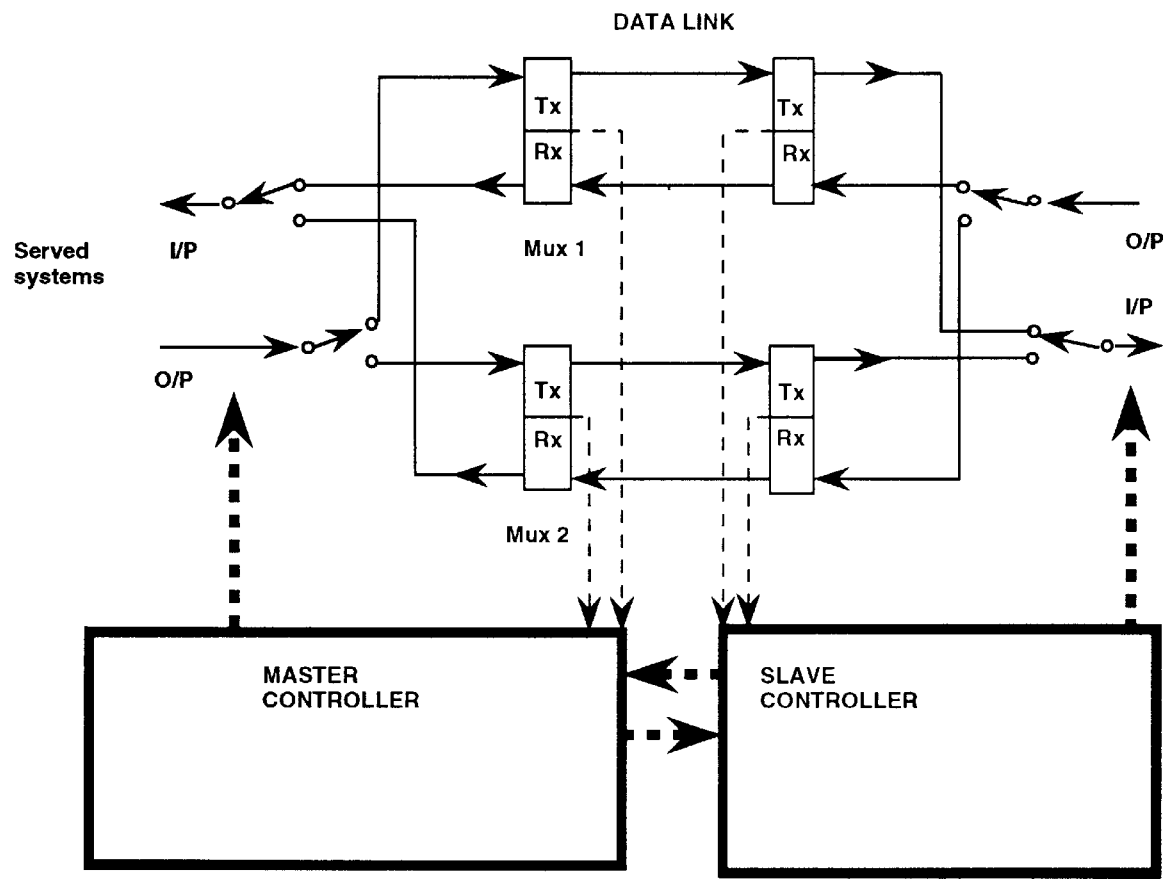
FIG. 4 shows an overview of a prior art multiplex line system operating in a master/slave controller relationship.

FIG. 3 shows in detail the switching mechanism of a protection device employing a single EPLD which acts upon the data being communicated to and from a served system to a main multiplexed switch. The EPLD can also be configured so that it is under external control. The communication channels between the EPLD of the first tributary and further EPLDs are shown.

The invention provides a system where each multiplexer arrangement is autonomous but there can be provided a further arrangement wherein failure of one autonomous link can lead to another multiplexer arrangement controlling the disabled multiplexer arrangement.

It is possible to configure all the tributaries within a single block, such that only one auxiliary data communications channel is required for end to end co-ordination via a master to master telemetry system. This system can be configured such that served systems operate only at a single end i.e. the single end is autonomous. It is also possible for a served system to communicate to the multiplexer systems Mux1, Mux2 via a number of tributaries.

What is claimed is:

1. A telecommunication system comprising first and second multiplexed duplex lines which communicate with served systems via tributary channels, wherein each tributary channel is adapted to interface with the multiplexed duplex lines via a protection device associated with the tributary channels, wherein one protection device functions as a master protection device, which controls the other slave protection devices, and wherein, in the event of a malfunctioning of a particular multiplexed duplex line, the master protection device is adapted to switch the data being transmitted in a tributary channel through the other of the multiplexer-line arrangements via switches.

2. A telecommunications system according to claim 1 wherein the master protection device determines which of the two multiplexers should be used and controls the operation of the slave protection devices by means of a concatenated control bus.

3. A telecommunication system according to claim 1 wherein each protection device includes an erasable programmable logic device which receives tributary status data from one of the multiplexed duplex lines and actuates switches to route the communication via the other of the multiplexed duplex lines when one of the multiplexed duplex lines has degraded or failed.

4. A telecommunications system according to claim 1 wherein each protection device includes an erasable programmable logic device which receives tributary status data from one of the multiplexed duplex lines and actuates switches to route the communication via the other of the multiplexed duplex lines when one of the multiplexed duplex lines has degraded or failed and the tributary status data is passed from the slave protection devices to the master protection device by means of a concatenated control bus.

5. A telecommunications system according to claim 1 wherein the multiplexed duplex line communicates with only one group of served systems.

6. A telecommunications system according to claim 1 wherein the multiplexed duplex line communicates with several switched blocks of tributaries.

7. A telecommunication system comprising groups of first and second multiplexed duplex lines which communicate with served systems via tributary channels, wherein each tributary channel is adapted to interface with the multiplexed duplex lines via a protection device associated with the tributary channels, wherein one protection device functions as a master protection device which controls the other slave protection devices, and wherein, in the event of a malfunctioning of a particular multiplexed duplex line, the master protection device is adapted to switch the data being transmitted in a tributary channel through the other of the multiplexer-line arrangements via switches, wherein the master protection devices of each group of systems communicate with each other by means of a separate bus system.

8. A telecommunications system according to claim 7 wherein the tributary protection switches receive information from and transmit information to the served systems and transmit information to and receive information from the first and second multiplexers.

9. A telecommunications system according to claim 7 wherein the master protection device is configured to respond to an input signal from a remote controller.

10. A method of operating a telecommunications system comprising first and second multiplexed duplex lines which communicate with served systems via tributary channels, wherein each tributary channel is adapted to interface with the multiplexed duplex lines via a protection device associated with the tributary channels, wherein one protection device functions as a master protection device, which controls the other slave protection devices, the method steps comprising:

i) the master protection device receives data concerning the status of the tributary channels and the status of the lines via a telemetry system from first and second multiplexers Mux 1, Mux 2;

ii) the tributary protection devices receive information from the served systems;

iii) this data is then sent to the traffic input ports of each of the two multiplexed lines;

iv) the served systems receive information from each of the two multiplexed lines;

v) information from the traffic output ports of the two multiplexed lines is passed by the respective tributary protection devices to the respective served systems;

vi) a tributary status condition is passed from the multiplexers Mux 1, Mux 2 to each tributary protection switch device;

vii) signals are then received from the slave protection devices by the master protection device via the concatenated control and status bus, and;

viii) a decision is made by the master protection device MPD as to which of the two multiplexed duplex line should be used and this information is communicated to the slave protection devices SPD, by means of the control and status bus;

whereby, in the event of failure of a communication channel through a first multiplexed duplex line, all communications can be routed via a second multiplexed duplex line.

* * * * *